(12) United States Patent
Tomescu

(10) Patent No.: US 11,286,038 B2
(45) Date of Patent: Mar. 29, 2022

(54) PITCH CONTROL ASSEMBLY FOR AN AIRCRAFT-BLADED ROTOR

(71) Applicant: PRATT & WHITNEY CANADA CORP., Longueuil (CA)

(72) Inventor: Dana Tomescu, Brampton (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 527 days.

(21) Appl. No.: 16/558,497

(22) Filed: Sep. 3, 2019

(65) Prior Publication Data

US 2021/0061454 A1 Mar. 4, 2021

(51) Int. Cl.
*B64C 11/30* (2006.01)
*G01D 5/347* (2006.01)

(52) U.S. Cl.
CPC ............ *B64C 11/301* (2013.01); *G01D 5/347* (2013.01)

(58) Field of Classification Search
CPC .................................................... B64C 11/301
See application file for complete search history.

(56) References Cited

U.S. PATENT DOCUMENTS

| | | |
|---|---|---|
| 4,934,901 A | 6/1990 | Duchesneau |
| 5,748,111 A | 5/1998 | Bates |
| 5,897,293 A | 4/1999 | Arel et al. |
| 5,913,659 A | 6/1999 | Doolin et al. |
| 6,077,040 A | 6/2000 | Pruden et al. |
| 6,609,498 B2 | 8/2003 | Mathews et al. |
| 7,545,518 B2 * | 6/2009 | Heyworth ........... G01D 5/36 356/620 |
| 8,464,598 B2 | 6/2013 | Cazaux et al. |
| 8,687,206 B2 | 4/2014 | Hockaday |
| 8,692,543 B2 | 4/2014 | Sanchez Exposito et al. |
| 9,821,901 B2 | 11/2017 | Duke et al. |
| 2014/0007591 A1 | 1/2014 | Khibnik et al. |
| 2018/0050789 A1 | 2/2018 | Marone et al. |
| 2018/0304991 A1 | 10/2018 | Kudrna et al. |

FOREIGN PATENT DOCUMENTS

| | | |
|---|---|---|
| DE | 10012202 A1 | 9/2001 |
| EP | 0353076 | 1/1990 |
| EP | 0353076 A2 | 1/1990 |
| GB | 2067763 A | 7/1981 |

* cited by examiner

*Primary Examiner* — Richard A Edgar
(74) *Attorney, Agent, or Firm* — Norton Rose Fulbright Canada LLP

(57) ABSTRACT

The present disclosure provides methods and systems for controlling a pitch for an aircraft-bladed rotor. A plurality of sensor signals are obtained from at least one sensor positioned proximate to a feedback device, the feedback device coupled to rotate with the rotor about a longitudinal axis and to move along the longitudinal axis with adjustment of a blade pitch angle of the rotor, the sensor signals produced responsive to detecting passage of a plurality of position markers of the feedback device, the plurality of position markers spaced circumferentially around the feedback device and having lengths along the longitudinal axis which vary monotonically and incrementally along at least part of the circumference of the feedback device. The plurality of sensor signals are processed to identify passage of the plurality of position markers. A feedback signal indicative of the blade pitch angle is generated based on the processed sensor signals.

20 Claims, 7 Drawing Sheets

600

```
┌─────────────────────────────────────────────────────────┐ 602
│ Obtaining a plurality of sensor signals from at least one│
│   sensor positioned proximate to a feedback device      │
└─────────────────────────────────────────────────────────┘
                            │
                            ▼
┌─────────────────────────────────────────────────────────┐ 604
│ Processing the plurality of sensor signals to identify  │
│   passage of a plurality of position markers of the     │
│                   feedback device                       │
└─────────────────────────────────────────────────────────┘
                            │
                            ▼
┌─────────────────────────────────────────────────────────┐ 606
│ Generating, based on the processed sensor signals, a    │
│  feedback signal indicative of the blade pitch angle    │
└─────────────────────────────────────────────────────────┘
```

FIG. 6

PITCH CONTROL ASSEMBLY FOR AN AIRCRAFT-BLADED ROTOR

TECHNICAL FIELD

The present disclosure relates generally to aircraft engines, and more specifically to pitch control systems for aircraft engines.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine.

The feedback device has multiple readable markers disposed on an outer surface thereof, and a sensor can be used to measure the rotation of the feedback device via the markers, providing a proxy value for the rotational speed of the engine, as well as measure blade angle. Existing feedback devices are however vulnerable to a so-called "edge-effect" that leads to an increase in reading error as the sensor approaches the edges of the feedback device.

Therefore, improvements are needed.

SUMMARY

In accordance with a broad aspect, there is provided a pitch control assembly for an aircraft-bladed rotor, the rotor rotatable about a longitudinal axis and having an adjustable blade pitch angle. The assembly comprises a feedback device coupled to rotate with the rotor and to move along the longitudinal axis with adjustment of the blade pitch angle, the feedback device comprising a plurality of position markers spaced circumferentially around the feedback device and having lengths along the longitudinal axis which vary monotonically and incrementally along at least part of the circumference of the feedback device. The assembly also comprises at least one sensor positioned proximate to the feedback device and configured for producing a sensor signal in response to detecting passage of the plurality of position markers as the feedback device rotates about the longitudinal axis. The assembly further comprises a control unit communicatively coupled to the at least one sensor and configured to generate a feedback signal indicative of the blade pitch angle in response to the sensor signals received from the plurality of sensors.

In accordance with another broad aspect, there is provided a method for controlling a pitch for an aircraft-bladed rotor, comprising: obtaining a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers spaced circumferentially around the feedback device and having lengths along the longitudinal axis which vary monotonically and incrementally along at least part of the circumference of the feedback device; processing the plurality of sensor signals to identify passage of the plurality of position markers of the feedback device; and generating, based on the processed sensor signals, a feedback signal indicative of the blade pitch angle.

In accordance with a further broad aspect, there is provided a system for controlling a pitch for an aircraft-bladed rotor. The system comprises a processing unit and a non-transitory computer-readable memory communicatively coupled to the processing unit and comprising computer-readable program instructions. The computer-readable program instructions are executable by the processing unit for receiving a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers spaced circumferentially around the feedback device and having lengths along the longitudinal axis which vary monotonically and incrementally along at least part of the circumference of the feedback device; processing the plurality of sensor signals to generate a combined sensor signal; and generating, based on the combined sensor signal, a feedback signal indicative of the blade pitch angle.

Features of the systems, devices, and methods described herein may be used in various combinations, in accordance with the embodiments described herein.

BRIEF DESCRIPTION OF THE DRAWINGS

Reference is now made to the accompanying figures in which:

FIG. 6 is a flowchart illustrating an example method for controlling pitch for an aircraft-bladed rotor.

It will be noted that throughout the appended drawings, like features are identified by like reference numerals.

DETAILED DESCRIPTION

Figure 1:
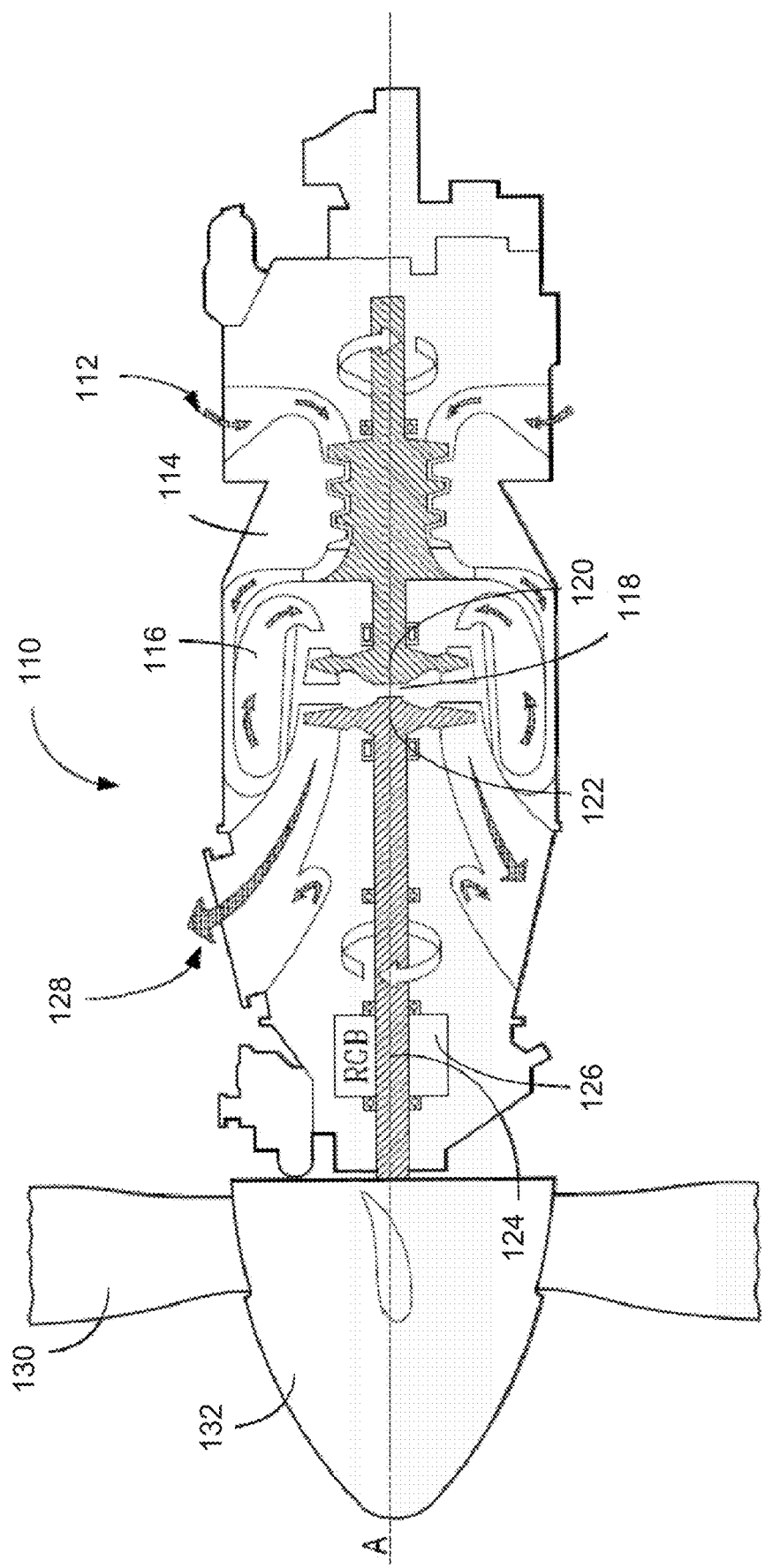
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Rotation of the output shaft 124 is facilitated by one or more bearing assemblies, which can be disposed within the RGB 126 or at any other suitable location. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Figure 2:
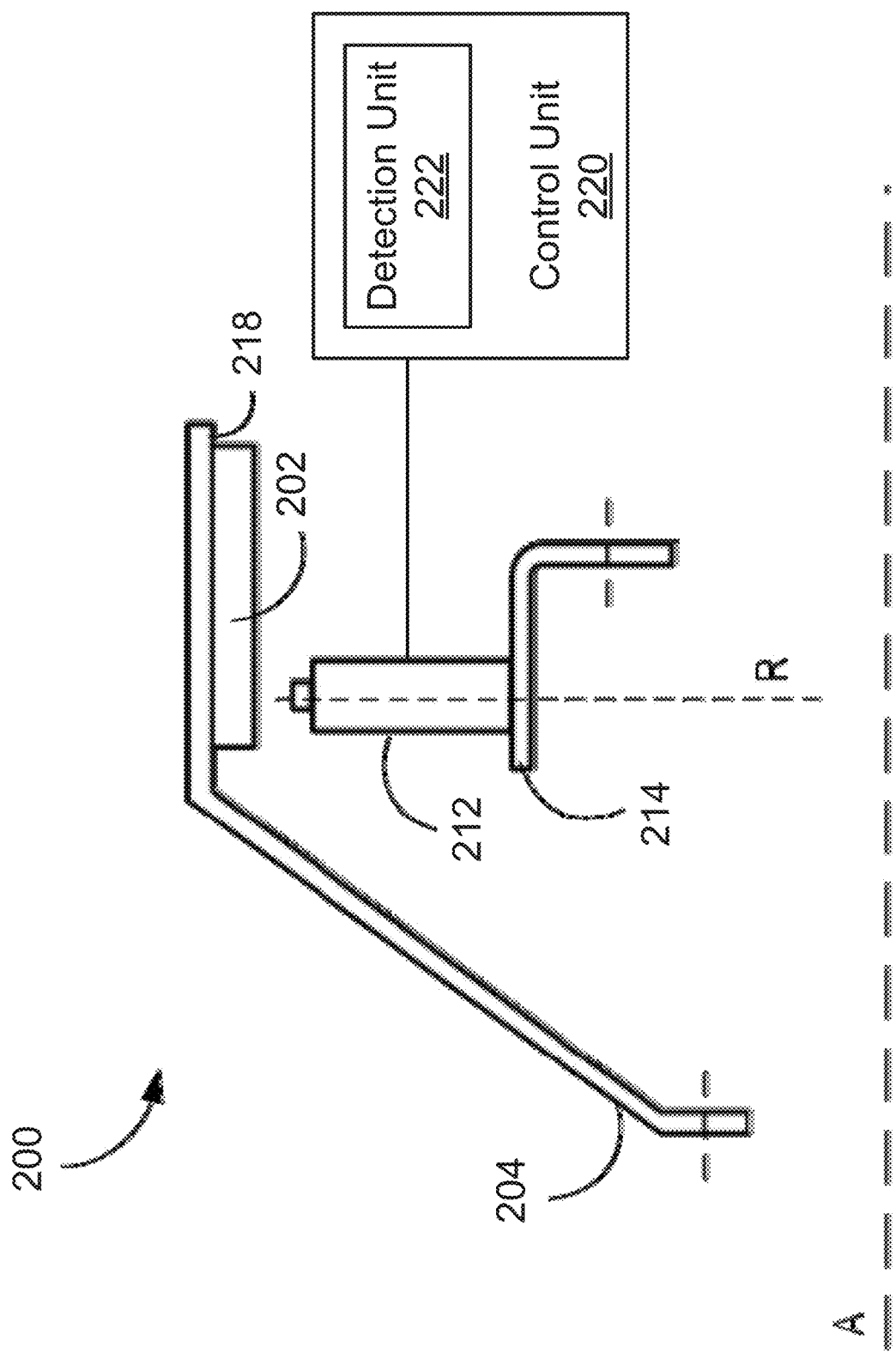
FIG. 2 is a schematic diagram of an example pitch control system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational speed of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 212 positioned proximate the annular member 204. Annular member 204 (referred to herein as a feedback device) has a plurality of circumferentially-spaced apart and detectable features (also referred to as position markers or teeth) 202 disposed thereon for detection by sensor(s) 212. In some embodiments, the position markers 202 and sensor(s) 212 may be disposed on a radially-outer side of feedback device 204. Alternatively, position markers 202 and sensor(s) 212 could be disposed on a radially-inner side of feedback device 204. Several position markers 202 may be spaced about the circumference (i.e., the perimeter) of the feedback device 204. The position markers 202 can be spaced equiangularly, at varying intervals, or the like. In addition, the feedback device 204 can include any suitable number of position markers 202, which can vary based on the dimensions of the feedback device 204. Other embodiments may apply.

In one embodiment, the one or more sensors 212 are fixedly mounted to a static portion of the engine 110. In other embodiments, the one or more sensors 212 are mounted for rotation with propeller 130 and to move axially with adjustment of the blade angle of the blades of the propeller 130, and the feedback device 204 is fixedly mounted to a static portion of the engine 110.

In some embodiments, the feedback device 204 is mounted for rotation with propeller 130 and to move axially along rotation axis 'A' to a plurality of axial positions, with adjustment of the blade angle of the blades of the propeller 130. An axial position of the feedback device 204 may then correspond to a respective angular (pitch) position of the blades and the position markers 202 may be useful for detecting the axial position of the feedback device 204 as the feedback device 204 and bladed rotor 130 rotate. The feedback device 204 may therefore be useful for detecting the angular position of the adjustable blades by way of correlation.

The system 200 also includes a control unit 220 communicatively coupled to the one or more sensors 212. The sensor(s) 212 are configured for producing one or more sensor signals which are transmitted to or otherwise received by the control unit 220, for example via a detection unit 222 thereof. The sensor signal can be an electrical signal, digital or analog, or any other suitable type of signal. In some embodiments, the sensor(s) 212 produce a signal pulse in response to detecting the presence of a position marker 202 in a sensing zone of the sensor 212. For example, the sensor 212 is an inductive sensor that operates on detecting changes in magnetic flux, and has a sensing zone which encompasses a circular or rectangular area or volume in front of the sensor 212. When a position marker 202 is present in the sensing zone, or passes through the zone during rotation of the feedback device 204, the magnetic flux generated by the sensor(s) 212 in the sensing zone is varied by the presence of the position marker 202, and the sensor 212 can produce a signal pulse, which forms part of the sensor signal. Accordingly, the position markers 202 may be made of any suitable material (e.g., a ferromagnetic material, Mu-Metal, or the like) which would cause the passage of the position markers 202 near the sensor 212 to provide a change in magnetic permeability within the magnetic field generated by the sensor 212.

In the example illustrated in FIG. 2, a side view of a portion of feedback device 204 and sensor 212 in accordance with at least some embodiments is shown. The sensor 212 is mounted to a flange 214 of a housing of the reduction gearbox 126, so as to be positioned adjacent the plurality of position markers 202, which extend away from the feedback device 204 and towards the sensor 212. The sensor 212 may be mounted at any suitable angle relative to the position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate.

In some embodiments, a single sensor 212 is mounted in close proximity to the feedback device 204 and the position markers 202. In some other embodiments, in order to provide redundancy as well as multiple signal sources at different axial locations, one or more additional sensors, which may be similar to the sensor 212, are provided. In particular, it may be desirable to use multiple sensors when the axial distance (i.e. the distance along axis 'A') travelled by the feedback device 204 is too large for the range of the sensors as in 212. It should be understood that any suitable number of sensors may apply and the number of sensors 212 and their positions may be optimized according to the specifics of the application.

Figure 3B:
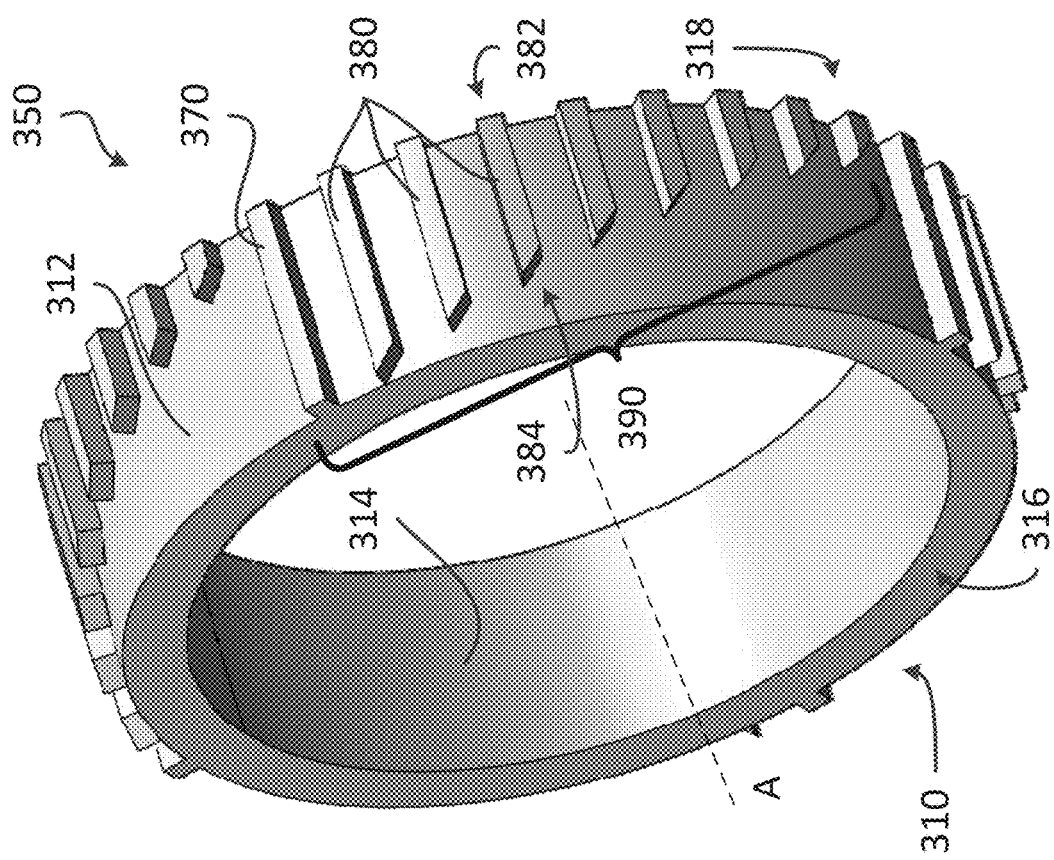
FIGS. 3A-B are perspective views of example feedback devices.
Figure 3A:
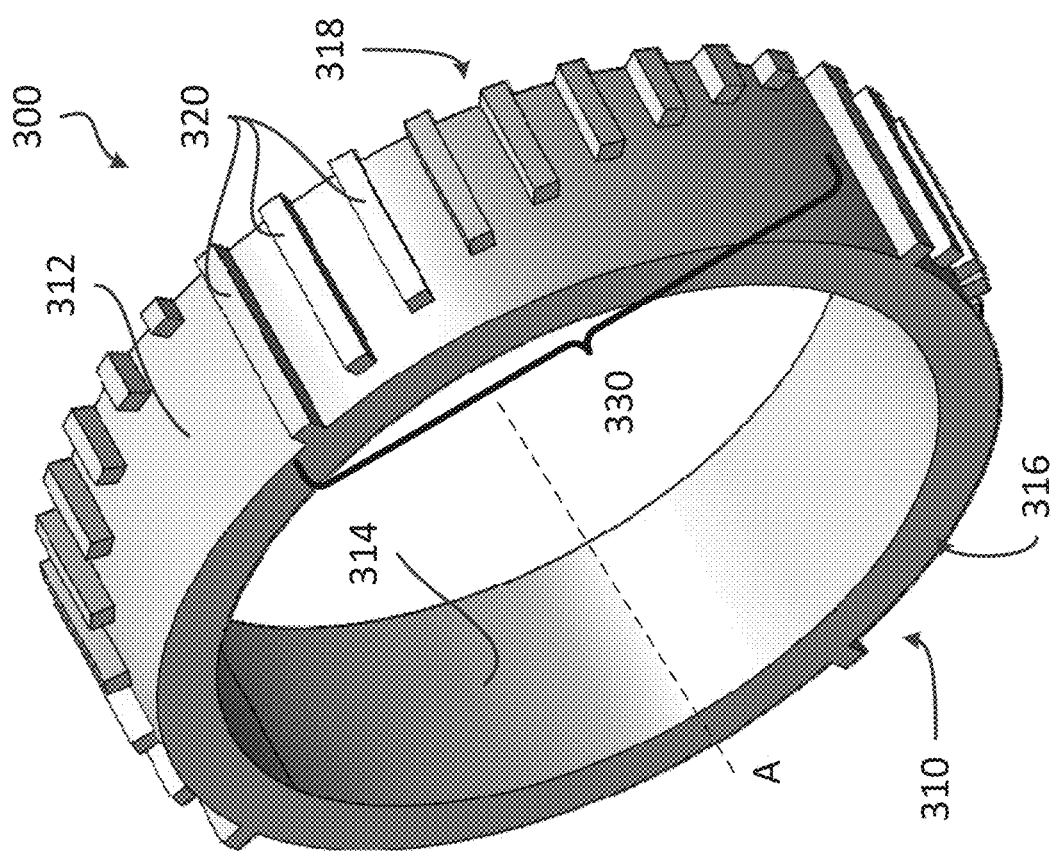

With reference to FIG. 3A, an embodiment 300 of the feedback device 204 is illustrated (hereinafter referred to as "feedback device 300"). The feedback device 300 is composed of a ring element 310 on which are formed a plurality of position markers 320. The ring element 310 can be of any suitable size (diameter, circumference, longitudinal thickness, etc.), and can be composed of any suitable material, as discussed hereinabove. The ring element 310 defines an outer surface 312 and an inner surface 314, which extend between end surfaces 316 and 318.

In the embodiment of FIG. 3A, the position markers 320 are shown as projecting outward from an outer surface 312 of the ring element 310. It should be understood that in other embodiments, the position markers 320 can be formed on an inner surface 314 of the ring element 310. The position markers 320 which project outward from the outer surface 312 of the ring element 310 can be of any suitable height, and can be spaced equiangularly or at varying angular distances from one another.

In at least some embodiments, the position markers 320 are of varying longitudinal lengths; that is to say, the length of each of the position markers 320 along the longitudinal axis of the feedback device 300, which corresponds to axis 'A' of FIGS. 1 and 2, varies from one position marker 320 to the next. For example, at least some of the position markers 320 span substantially the entire longitudinal length of the ring element 310, and at least some others of the position markers 320 span less than the entire longitudinal length of the ring element 310.

The length of the position markers 320 can vary as a function of the circumferential position of the position markers 320 with respect to the feedback device 300. That is to say, from a particular starting point on the feedback device 300 and moving along the circumference of the feedback device 300 in a particular direction, successive position markers 320 will have longitudinal lengths which differ from those of neighbouring position markers 320. In some embodiments, the longitudinal length of the position markers 320 varies monotonically over part or all of the circumference of the feedback device. For example, from one position marker 320 to the next in a given circumferential direction, the longitudinal lengths of all position markers 320 will either increase incrementally, or decrease incrementally. In some embodiments, including the feedback device 300 shown in FIG. 3A, the longitudinal length of the position markers 320 varies by a common increment from one to the next. In some other embodiments, the longitudinal length of the position markers 320 can vary by different increments from one to the next.

The position markers 320 can be of any suitable longitudinal length, and in some embodiments a minimum longitudinal length can be defined, for instance based on the sensitivity of the sensors 212 used to detect the position markers. In some embodiments, the position markers 320 have a common starting point, for instance at first edge surface 318 of the ring element 310, and extend varying distances toward a second edge surface 316 of the ring element 310. In other embodiments, the position markers 320 share a common midpoint, for instance at a midpoint between the edge surfaces 316, 318, and extend varying distances towards one or both of the edge surfaces 316, 318 from the midpoint. In some other embodiments, one or more of the position markers 320 can extend beyond the edge surfaces 316, 318. Other approaches are also considered.

The position markers 320 are substantially parallel to one another, and substantially collinear with axis 'A'. In some embodiments, certain position markers 320 can have a thickness (i.e., a circumferential length) different than other position markers. Alternatively, or in addition, certain position markers 320 can have a height (i.e., a radial length) different than other position markers. Other embodiments are also considered.

In some embodiments, the position markers 320 are split into groups or sets which form a particular pattern 330, which can be repeated multiple times on the ring element 310. For example, in the embodiment of FIG. 3A, the pattern 330 is composed of nine (9) position markers 320, and is repeated four (4) times. In other embodiments, the pattern 330 can be repeated more, or fewer times, and can be composed of more, or fewer position markers 320.

In some embodiments, the position markers 320 have substantially the same size and shape, excepting the varying longitudinal length. In some embodiments, one or more of the position markers 320 have a shape, size, or material composition which varies with respect to the rest of the position markers 320. For instance, one of the position markers 320 can be slightly taller (i.e., extend further from the ring element 310) than the remainder of the position markers 320. In another instance, one position marker 320 from each of the patterns 330 is slightly wider (i.e., covers a wider arc of the ring element 310) than the remainder of the position markers 320. In yet another instance, one of the position markers 320 is made of a different material than the remainder of the position markers, or is provided with a coating or the like. Other embodiments are also considered.

With reference to FIG. 3B, another embodiment 350 of the feedback device 204 is illustrated (hereinafter referred to as "feedback device 350"). Similarly to the embodiment of 3A, the feedback device 350 is composed of a ring element 310 and a plurality of position markers 370, 380, which are subdivided into multiple repeating patterns 390, which can be similar to the pattern 330, or different therefrom. The position markers 370 have different geometry from the position markers 380 insofar as the position markers 370 have straight edges, whereas the position markers 380 are provided with chamfered edges. In some embodiments, including the embodiment illustrated in FIG. 3B, the position markers 380 are each provided with one chamfered edge, for instance at distal ends 384 thereof. In some embodiments, proximal edges 382 can also, or alternatively, be chamfered. Other approaches for providing the position marker 370 with different geometry than the position markers 380 are also considered.

In some embodiments, the peak of the chamfered end of a first position marker 380 can be substantially at the same longitudinal position as the base of the chamfered end of an adjacent position marker 380. In some other embodiments, the peak of the chamfered end of a first position marker 380 can extend to a longitudinal length beyond that of the base of the chamfered end of the adjacent position marker 380. For example, it can occur that the base of the chamfered ends of the position markers 380 are more difficultly detectable, for instance by the sensor 212. As a result, the peaks of the chamfered end of position markers 380 can be made to extend longitudinally beyond the base of the chamfered ends of adjacent position markers 380, so that the sensor 212 can detect peaks even when bases are difficult to detect. Other embodiments are also considered.

Figure 4:
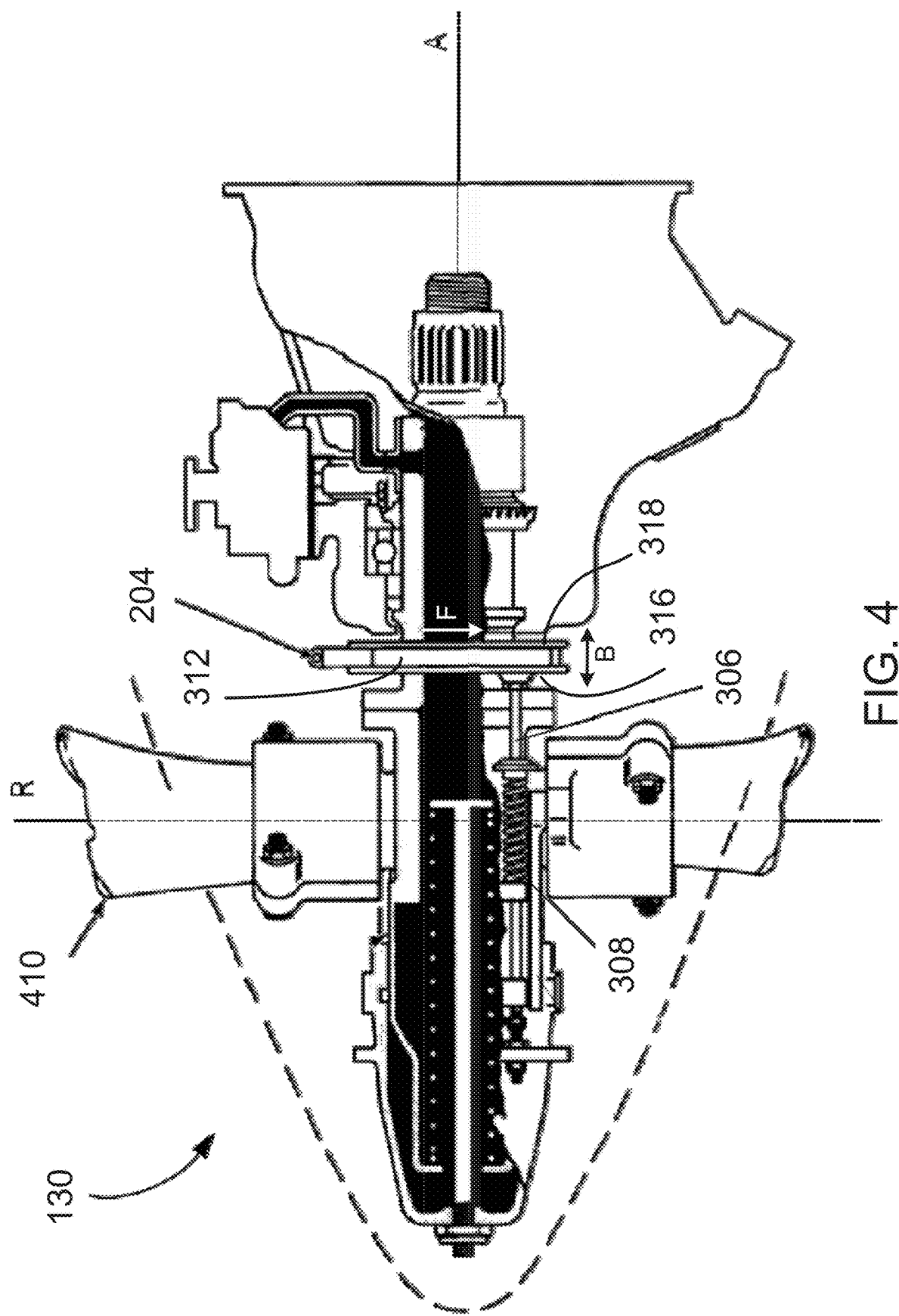
FIG. 4 is a schematic diagram of the propeller of FIG. 1 with the pitch control system of FIG. 2, in accordance with at least one embodiment.

With additional reference to FIG. 4, the feedback device 204—for instance, as embodied in the feedback devices 300 and/or 360—is a circular disk which rotates as part of the engine 110, for example with the propeller shaft 124 or with the propeller 130. For example, the circular disk can be the ring element 310. The feedback device 204 comprises opposing faces having the edge surfaces 316, 318 and defining the outer surface 312 (sometimes referred to as a "root surface") which extends between the opposing faces and circumscribes them. Put differently, the outer surface 312 of the feedback device 204 is the outer periphery of the ring element 310 which spans between the two opposing edge surfaces 316, 318 and the outer surface 312 intersects the faces at the edge surfaces 316, 318. In these embodiments, the position markers 202—as embodied as the position markers 320 and/or 370, 380—can take the form of projections which extend from the outer surface 312.

The position markers 202 consist of a plurality of projections arranged along a direction substantially transverse to the edge surfaces 316, 318. In some embodiments, the position markers 202 are be substantially equally spaced from one another on the root surface outer surface 312; alternatively, the spacing between the position markers 202 can vary. In some embodiments, the position markers 202 are integrally formed with the feedback device 204 so that the feedback device 204 may have a unitary construction. In some other embodiments, the position markers 202 are manufactured separately from the feedback device 204 and attached thereto using any suitable technique, such as welding or the like.

It should also be noted that, although the present disclosure discusses embodiments in which the position markers 202 are projections, other embodiments are also considered. The position markers 202 may, for example, comprise one or more of protrusions, teeth, walls, voids, recesses, and/or other singularities. For instance, in some embodiments, the position markers 202 may be embedded in the ring element 310 portion of the feedback device 204, such that the feedback device 204 has a substantially smooth or uniform outer surface 312. A position marker 202 can then be a portion of the feedback device 204 which is made of a different material, or to which is applied a layer of a different material. The position markers 202 may then be applied to the outer surface 312, for instance as strips of metal or other material for detection by the sensor 212, which can be an inductive sensor capable of sensing changes in magnetic flux (as discussed above) or any other suitable sensor such as a Hall sensor or a variable reluctance sensor. Still other embodiments are considered.

The signal pulses produced by the sensor 212, which form part of the electrical signal received by the control unit 220, can be used to determine various operating parameters of the engine 110 and the propeller 130. The position markers 202 can be used to determine a longitudinal position of the feedback device 204, and thereby assess the pitch angle for the propeller 130. In addition, detection of the position markers 202 can be used to determine a rotational speed of the feedback device 204, and thereby assess a rotational speed for the propeller 130.

Assessment of the longitudinal position of the feedback device 204 can be performed in various fashions. The longitudinal position of the feedback device 204 can be used as a proxy for the propeller blade pitch angle, as noted hereinabove. In some embodiments, the longitudinal position of the feedback device 204 is determined by counting the number of position markers 202 which are detected by the sensor 212 over one revolution of the feedback device 204. For example, the feedback device 204 can have 59 position markers 202 defined thereon which are of different lengths, varying incrementally and monotonically from a first, shortest position marker 202 to a last, longest position marker 202, and one missing tooth. Every time the sensor 212 detects the missing tooth, the control unit 220 can identify the start or end of a revolution of the feedback device 204. As the longitudinal position of the feedback device 204 changes, the sensor 212, which is at a fixed location, will detect more, or fewer, of the position markers 202 for every revolution. In this fashion, the signal pulses produced by the sensor 212 can be used to determine the longitudinal position of the feedback device 204. It should be noted that in alternative examples, the feedback device 204 can rotate at a fixed position, and the sensor 212 can be displaced with changes to the propeller blade pitch angle.

In another example, the feedback device 204 can have 60 position markers 202 defined thereon which are of different lengths and one missing tooth. The position markers 202 form four (4) repeating patterns of 15 position markers 202 which, within each pattern, vary incrementally and monotonically from a first, shortest position marker 202 to a last, longest position marker 202. The majority of the position markers 202 in each of the repeating patterns can be provided with chamfered edges.

As the longitudinal position of the feedback device 204 changes, the sensor 212, which is at a fixed location, will detect more, or fewer, of the position markers 202 for every revolution. In this fashion, the signal pulses produced by the sensor 212 can be used to determine the longitudinal position of the feedback device 204. For additional precision, the signal pulses produced by the sensor 212 can be used to determine whether the sensor 212 is detecting a chamfered end for one or more of the position markers 202. For instance, if the signal pulse produced by the sensor 212 for one of the position markers 202 is different from the signal pulse for an adjacent one of the position markers 202, this can indicate that the sensor 212 has detected the chamfered edge of a particular one of the position markers 202. In some cases, the amount of change in the signal pulse for the chamfered edge vis-à-vis the signal pulse for a normal reading of the position marker 202 can be used to indicate how far along the chamfered edge the sensor 212 produced the pulse. This can be used to assess with greater precision the longitudinal position of the feedback device 204.

In some embodiments, certain circumferential regions of the feedback device 204 can be provided with position markers 202 having different circumferential thicknesses and/or different chamfered edges than those in other circumferential regions. For instance, when the propeller 130 is in a particular regime, such as a reverse thrust regime, a particular circumferential region of the feedback device 204 can be detectable by the sensor 212. The particular circumferential region can be provided with more position markers 202, position markers which have longer and/or steeper chamfered ends, or other features which can improve detection and precision of the longitudinal position of the feedback device 204.

Assessment of the rotational speed of the feedback device 204 can be performed in various fashions. In some embodiments, a known number of the position markers 202 are of a different geometry than the remainder of the position markers 202, as illustrated in FIG. 3B. The sensor 212 can detect the position markers 202 with different geometry, and based thereon can determine the rotational speed of the feedback device 204. In some other embodiments, a discontinuity is formed in the position markers 202 of the feedback device 204, for instance in the form of one or more "missing teeth". When a missing tooth passes by the sensor 212, no change in the sensor signal is produced. In this fashion, a longer-than-expected period in which no change in the sensor signal is detected can indicate the passage of the missing tooth. Repeated detections of the missing tooth can be used to assess the rotational speed of the feedback device 204. Other approaches are also considered.

With continued reference to FIG. 4, the feedback device 204 is supported for rotation with the propeller 130, which rotates about the longitudinal axis 'A'. The feedback device 204 is also supported for longitudinal sliding movement along the axis 'A', e.g. by support members, such as a series of circumferentially spaced feedback rods 306 that extend along the axis 'A'. A compression spring 308 surrounds an end portion of each rod 306.

As depicted in FIG. 4, the propeller 130 comprises a plurality of angularly arranged blades 410, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full (or maximum) reverse mode is associated with negative blade angles.

With continued reference to FIGS. 2, 3A-B, and 4, as the feedback device 204 rotates, varying portions thereof enter, pass through, and then exit the sensing zone of the one or more sensors 212. From the perspective of the sensor(s) 212, the feedback device 204 moves axially along axis 'A' (in the direction of arrow 'B' in FIG. 4) and rotates about direction 'F' (shown in FIG. 4). With axial travel of the feedback device 204, the one or more sensors 212 are therefore positioned adjacent to different portions of the feedback device 204. In particular, a given sensor 212 is adjacent the edge surface 318 (also referred to as the 'engine side') when the propeller is in a primary blade angle position. When the propeller 130 is in the maximum reverse condition, the sensor 212 is adjacent the edge surface 316 (also referred to as the 'propeller side'). The longitudinal (or beta) position (along axis 'A') of the feedback device 204 relative to the sensor 212 therefore varies with movement of the feedback ring 204.

When the sensor 212 is positioned adjacent to the edge surfaces 316, 318 with movement of the feedback ring 204, a drop in magnetic flux detected by the sensor 212 occurs. This results in a so-called "edge-effect" that leads to an increase in reading error (also referred to herein as beta error) at the edge surfaces 316, 318, particularly as the feedback device 204 moves away from the sensor 212.

Figure 5:
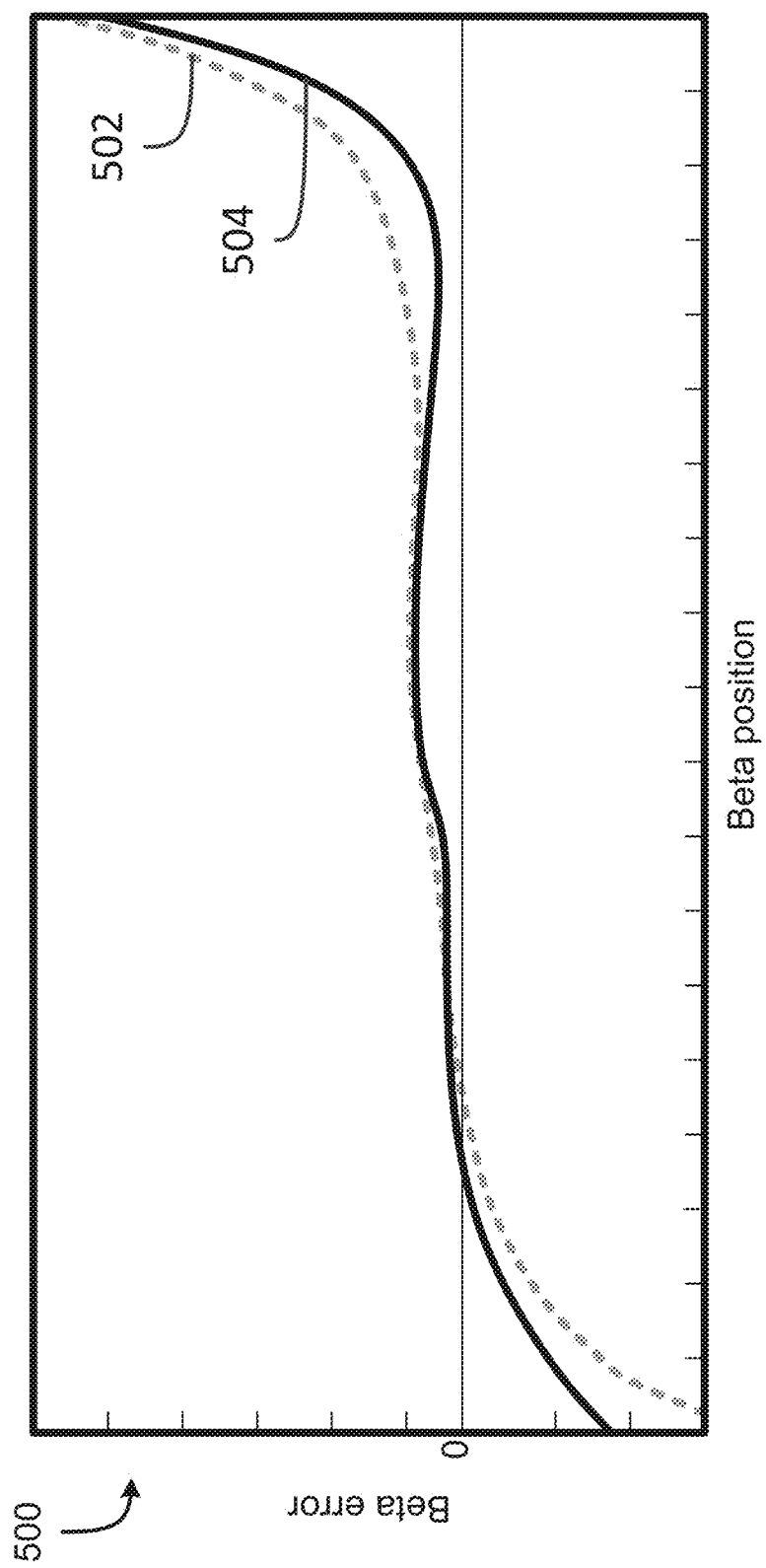
FIG. 5 is an example plot of beta error as a function of beta position.

FIG. 5 shows a plot 500 of the beta error as a function of the beta position of a given sensor 212 relative to the feedback device 204. The plot 500 illustrates the above-referenced edge-effect for a prior art feedback device, as line 502, and the edge-effect for an embodiment of the feedback device 204, as line 504. For example, the prior art feedback device can be a feedback device which incorporates one or more angled teeth, which, in certain circumstances, can contribute to producing edge effect. As illustrated in FIG. 5, reduced beta error can be obtained using embodiments of the feedback device 204. For example, the range of beta positions for the feedback device 204 which produce a near-zero beta error is increased vis-à-vis the beta error for the prior art feedback device. It should be understood that the values illustrated in FIG. 5 are examples, and may not be representative of beta error values for all embodiments of the feedback device 204 described herein.

With reference to FIG. 6, there is illustrated a flowchart for a method 600 for controlling a pitch for an aircraft-bladed rotor, for instance the propeller 130. The method 600 is illustratively performed by the detecting unit 222 and/or by the control unit 220. At step 602, a plurality of sensor signals are obtained from at least one sensor positioned proximate to a feedback device, for instance from the sensor 212 positioned proximate the feedback device 204. The feedback device 204 can be any suitable feedback device, for instance embodied as the feedback device 300 or the feedback device 350.

At step 604, the sensor signals are processed, for instance by the detecting unit 222 and/or by the control unit 220, to identify the passage of a plurality of position markers of the feedback device 204, for instance the position markers 202. The passage of the position markers 202 by the sensor 212 can be identified in a variety of fashions. In some embodiments, identification of the passage of the position markers 202 can be performed using a mark-space ratio (MSR) technique, which is described in United States Patent Application Publication No. 2018/0050789 A1, which is incorporated herein by reference.

For example, the MSR technique can be used to detect zero-crossings of the signals produced by the sensors 212. In embodiments in which some or all of the position markers 202 have chamfered ends, the zero-crossing of the sensor signals will vary as the feedback device 204 translates axially. For instance, the time at which the zero-crossing occurs will vary as a function of the axial position of the feedback device 204. As a result, changes in the zero-crossing position will change the MSR, and the axial position of the feedback device 204 can be identified based on the MSR. In some other embodiments, other detection methods can be used to detect the passage of the position markers 202.

At step 606, after the sensor signals are processed, a feedback signal indicative of blade pitch angle can be generated based on the processed sensor signals. The feedback signal can be any suitable type of signal, can encode information in any suitable fashion, and can be transmitted from the detecting unit 222 and/or the control unit 220 to any other suitable system, for instance an avionics system of an aircraft of which the engine 110 is a component. In some embodiments, the feedback signal can also be indicative of a rotational speed of a component with which the feedback device 204 rotates, for instance the propeller 130.

Figure 7:
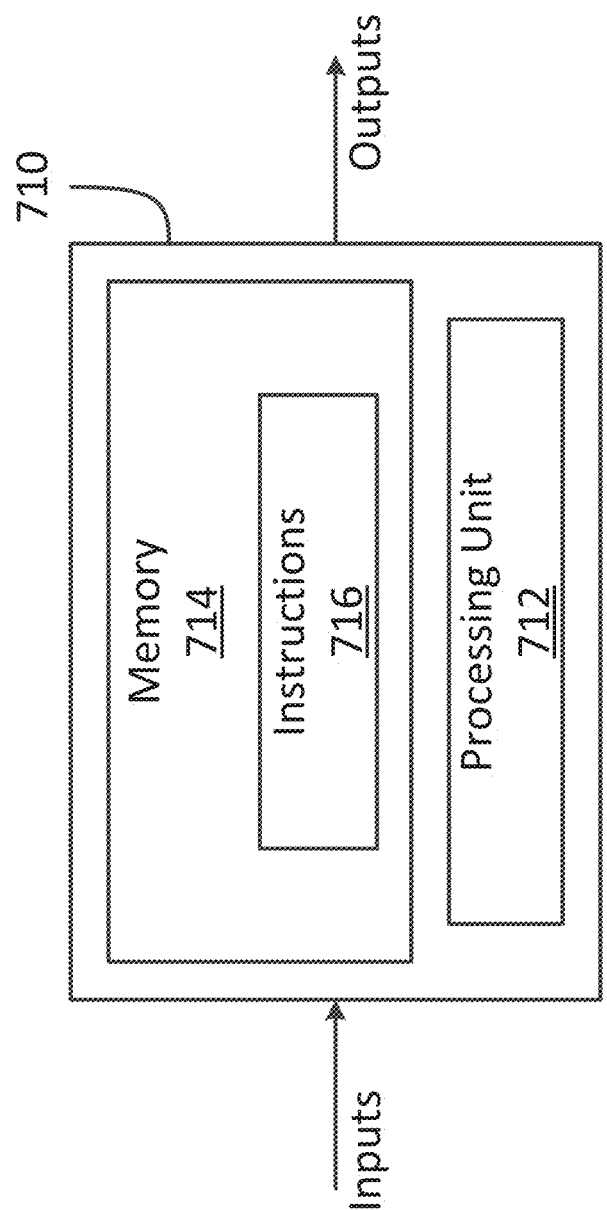
FIG. 7 is a block diagram of an example computing system for implementing the method of FIG. 6.

With reference to FIG. 7 the method 600 may be implemented using a computing device 710 comprising a processing unit 712 and a memory 714 which has stored therein computer-executable instructions 716. The processing unit 712 may comprise any suitable devices configured to implement the system such that instructions 716, when executed by the computing device 710 or other programmable apparatus, may cause the functions/acts/steps of the method 600 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712. In some embodiments, the computing device 710 can be implemented as part of a full-authority digital engine controls (FADEC) or other similar device, including electronic engine control (EEC), engine control unit (ECU), and the like.

The methods and systems described herein may be implemented in a high level procedural or object oriented programming or scripting language, or a combination thereof, to communicate with or assist in the operation of a computer system, for example the computing device 710. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 712 of the computing device 710, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A pitch control assembly for an aircraft-bladed rotor, the rotor rotatable about a longitudinal axis and having an adjustable blade pitch angle, the assembly comprising:
   a feedback device coupled to rotate with the rotor and to move along the longitudinal axis with adjustment of the blade pitch angle, the feedback device comprising a plurality of position markers spaced circumferentially around the feedback device and having lengths along the longitudinal axis which vary monotonically and incrementally along at least part of the circumference of the feedback device;
   at least one sensor positioned proximate to the feedback device and configured for producing a sensor signal in response to detecting passage of the plurality of position markers as the feedback device rotates about the longitudinal axis; and
   a control unit communicatively coupled to the at least one sensor and configured to generate a feedback signal indicative of the blade pitch angle in response to the sensor signals received from the plurality of sensors.

2. The pitch control assembly of claim 1, wherein the plurality of position markers is a first plurality of position markers, the feedback device further comprising at least a second plurality of position markers, wherein the lengths of the first plurality of position markers define a predetermined pattern, and wherein lengths along the longitudinal axis of the second plurality of position markers match the predetermined pattern.

3. The pitch control assembly of claim 2, wherein the predetermined pattern defines, for at least one position marker of the first plurality of position markers, a differing geometry from the remainder of the position markers of the first plurality of position markers.

4. The pitch control assembly of claim 1, wherein the plurality of position markers have first and second ends, and wherein at least some of the plurality of position markers have chamfered first ends.

5. The pitch control assembly of claim 4, wherein the at least some of the plurality of position markers have chamfered second ends.

6. The pitch control assembly of claim 4, wherein a majority of the plurality of position markers have chamfered first ends.

7. The pitch control assembly of claim 1, wherein the plurality of position markers have lengths which vary incrementally by a common increment.

8. The pitch control assembly of claim 1, wherein the plurality of position markers have lengths which vary incrementally by different increments.

9. The pitch control assembly of claim 1, wherein the plurality of position markers are equally spaced circumferentially around the feedback device by a predetermined distance.

10. The pitch control assembly of claim 1, wherein the plurality of position markers define a discontinuity between two adjacent ones of the plurality of position markers detectable by the at least one sensor.

11. The pitch control assembly of claim 1, wherein the feedback signal is further indicative of a rotational speed of the aircraft-bladed rotor.

12. A method for controlling a pitch for an aircraft-bladed rotor, comprising:
   obtaining a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers spaced circumferentially around the feedback device and having lengths along the longitudinal axis which vary monotonically and incrementally along at least part of the circumference of the feedback device;
   processing the plurality of sensor signals to identify passage of the plurality of position markers of the feedback device; and
   generating, based on the processed sensor signals, a feedback signal indicative of the blade pitch angle.

13. The method of claim 12, wherein processing the plurality of sensor signals comprises identifying passage of at least one predetermined pattern defined within the plurality of position markers.

14. The method of claim 13, wherein identifying passage of at least one predetermined pattern comprises identifying at least one position marker within the at least one predetermined pattern which has a differing geometry from the remainder of the position markers of plurality of position markers of the at least one predetermined pattern.

15. The method of claim 12, wherein processing the plurality of sensor signals comprises detecting, for at least some of the plurality of position markers, at least one chamfered end thereof.

16. The method of claim 12, wherein processing the plurality of sensor signals comprises detecting a discontinuity between two adjacent ones of the plurality of position markers.

17. The method of claim 12, wherein processing the plurality of sensor signals to identify passage of the plurality of position markers comprises determining a mark-space ratio based on the plurality of sensor signals.

18. The method of claim 12, wherein the feedback signal is further indicative of a rotational speed of the aircraft-bladed rotor.

19. A system for controlling a pitch for an aircraft-bladed rotor, comprising:
   a processing unit; and
   a non-transitory computer-readable memory communicatively coupled to the processing unit and comprising computer-readable program instructions executable by the processing unit for:
      receiving a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers spaced circumferentially around the feedback device and having lengths along the longitudinal axis which vary monotonically and incrementally along at least part of the circumference of the feedback device;
      processing the plurality of sensor signals to generate a combined sensor signal; and
      generating, based on the combined sensor signal, a feedback signal indicative of the blade pitch angle.

20. The system of claim 19, wherein processing the plurality of sensor signals comprises detecting, for at least some of the plurality of position markers, at least one chamfered end thereof.

* * * * *